(12) United States Patent
Lee et al.

(10) Patent No.: US 7,296,101 B2
(45) Date of Patent: *Nov. 13, 2007

(54) METHOD AND SYSTEM FOR USING A PATCH MODULE TO PROCESS NON-POSTED REQUEST CYCLES AND TO CONTROL COMPLETIONS RETURNED TO REQUESTING DEVICE

(75) Inventors: Chee Siong Lee, Perlis (MY); Vui Yong Liew, Penang (MY); Mikal C. Hunsaker, El Dorado Hills, CA (US); Michael N. Derr, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 10/781,512

(22) Filed: Feb. 17, 2004

(65) Prior Publication Data
US 2005/0182869 A1    Aug. 18, 2005

(51) Int. Cl.
*G06F 5/00*    (2006.01)
(52) U.S. Cl. .................. 710/55; 714/798; 714/799
(58) Field of Classification Search .................. 714/8, 714/798, 99; 710/55
See application file for complete search history.

(56) References Cited
U.S. PATENT DOCUMENTS

| | | | | |
|---|---|---|---|---|
| 5,448,558 A | * | 9/1995 | Gildea et al. ............... 370/412 |
| 5,594,868 A | * | 1/1997 | Nakagoshi et al. ......... 709/234 |
| 5,664,223 A | * | 9/1997 | Bender et al. ................ 710/22 |
| 5,943,482 A | * | 8/1999 | Culley et al. ............... 710/302 |
| 5,966,547 A | * | 10/1999 | Hagan et al. .................. 710/57 |
| 6,158,018 A | * | 12/2000 | Bernasconi et al. ........... 714/8 |
| 6,314,024 B1 | * | 11/2001 | Kakihara ............... 365/185.09 |
| 6,339,801 B1 | * | 1/2002 | Hefferon et al. .............. 710/39 |
| 6,345,326 B1 | * | 2/2002 | Baskey et al. ................ 710/52 |
| 6,463,549 B1 | * | 10/2002 | Shperber et al. ............... 714/7 |
| 6,859,867 B1 | * | 2/2005 | Berry ......................... 711/206 |
| 7,111,301 B1 | * | 9/2006 | Johnson et al. ............. 718/105 |
| 2004/0237009 A1 | * | 11/2004 | Tester ......................... 714/710 |
| 2006/0050690 A1 | * | 3/2006 | Epps et al. ................. 370/359 |

* cited by examiner

*Primary Examiner*—Donald Sparks
*Assistant Examiner*—Ernest Unelus
(74) *Attorney, Agent, or Firm*—Blakely, Sokoloff, Taylor & Zafman LLP (57) ABSTRACT

A system is described for providing a patch mechanism within an input/output (I/O) controller, which can be used to workaround defects and conditions existing in the I/O controller. The system includes a patch module coupled to a completion queue included in the I/O controller. The patch module is used to sample incoming cycles received by the I/O controller and to determine if the captured incoming cycle matches one or more of preprogrammed trigger conditions. The patch module is capable of working around a captured non-posted request cycle by controlling header information loaded into the completion queue and by instructing the completion queue whether or not to discard a completion received from a designated end-device.

23 Claims, 7 Drawing Sheets

METHOD AND SYSTEM FOR USING A PATCH MODULE TO PROCESS NON-POSTED REQUEST CYCLES AND TO CONTROL COMPLETIONS RETURNED TO REQUESTING DEVICE

BACKGROUND

1. Field

Embodiments of the invention relate to the field of a patch mechanism, and more specifically, to a system and method that can be used to detect and workaround defects and conditions existing in an integrated circuit chip.

2. Background

Typically, host processor communicates with various end-devices, such as hard drives, USB (Universal Serial Bus) devices and PCI (Peripheral Component Interconnect) add-on cards, via a chipset. The chipset may include one or more integrated circuit chips, such as a memory controller and an I/O (input/output) controller. As an integrated circuit chip, such as the I/O controller, is tested, errors or defects may be discovered in the chip. Conventionally, when an error or defect is detected in the integrated circuit, one of a number of approaches may be taken. One approach is to de-feature the functionality if possible. This approach reduces the value of the product and may often be unacceptable. Another approach is to workaround the problem through software settings if possible. In this approach, the BIOS modifies the hardware behavior as the system boots to avoid the problem in the future. However, the software settings that are currently available tend to be very specific and, therefore, typically not useful for complex defects in highly integrated silicon chip. A further approach is to workaround the problem through modified software algorithms if possible. This approach can impact performance greatly and is not available in many situations.

In computer systems, host processor generates request cycles, which are directed towards the end-devices. Generally, there are two categories of cycles, i.e. a write request cycle that is used to transport data from the host processor to the end-user device or a read request cycle that is used to read data from the end-user device. When a read request cycle is targeting a specific device, a successful read request would result in read data being returned as a completion packet to the requesting device, such as the processor. However, if there is a design error in the decode logic of the end-device, this may cause the read request targeting it to be ignored. In such situations, a completion packet will not be returned to the processor that issued the read request and this may cause the processor to hang or freeze. Such problem may arise in situations, for example, where the cycle type accepted by a decode logic of the end-device is incorrect with respect to the specification. Conventionally, a hardware bug such as this may be fixed through changes made to the silicon design once the bug has been localized in the design. This approach, however, tends to be very expensive and requires long throughput to make the fix available.

BRIEF DESCRIPTION OF THE DRAWINGS

The invention is illustrated by way of example and not by way of limitation in the figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, specific details are set forth. However, it is understood that embodiments of the invention may be practiced without these specific details. In other instances, well-known circuits, structures and techniques have not been shown in detail to avoid obscuring the understanding of this description.

Figure 1A:
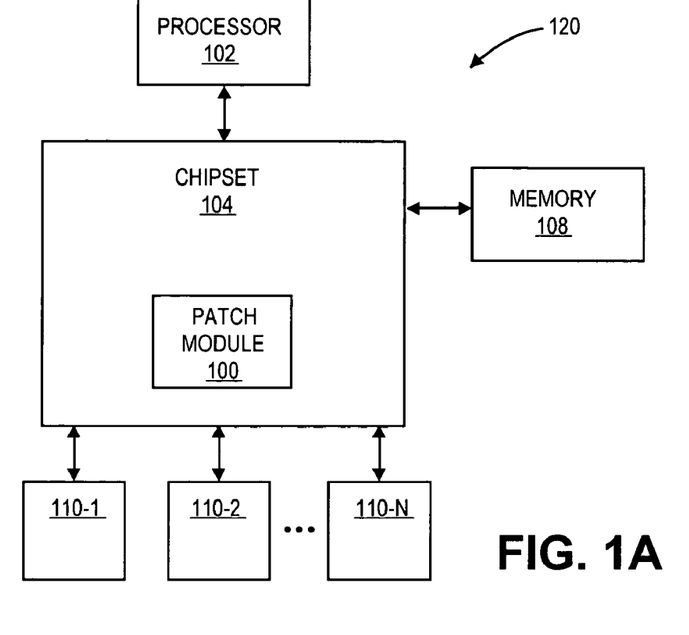
FIG. 1A shows a block diagram of one embodiment of a computer system in which a patch module may be implemented.

FIG. 1A shows one embodiment of computer system 120 in which patch module 100 may be implemented. System 120 includes processor 102, memory 108, chipset 104 and a number of devices 110-1 through 110-N. The devices 110 coupled to the chipset may include I/O devices, and other end-devices, such as storage devices, USB devices and PCI devices. Chipset 104 may include one or more integrated circuit chips, such as memory controller and I/O controller. In one embodiment, programmable patch module 100 is integrated into chipset 104 to enable a user to detect, repair and/or workaround a wide range of defects existing in the chipset. Patch module 100 may be used to workaround defects that are found after the production stepping has taped out. These workarounds could be distributed after going to production and platforms have been shipped out to the field, potentially avoiding a costly recall. A user may workaround a defect by using the patch module to ensure that the conditions that stimulate the defect can never exist.

Figure 1B:
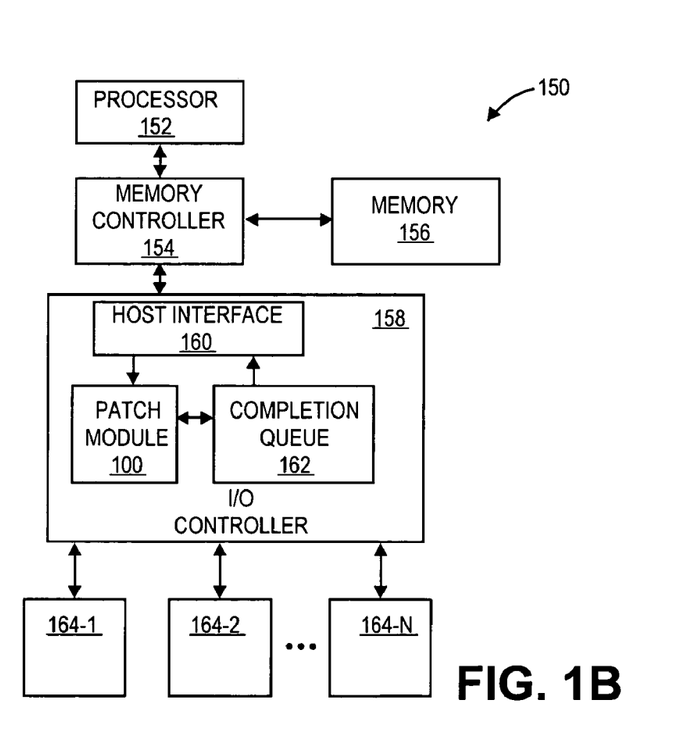
FIG. 1B shows a block diagram of another embodiment of a computer system in which a patch module may be implemented.

FIG. 1B shows another embodiment of computer system 150 in which patch module 100 is incorporated within I/O controller chip 158. System 150 includes processor 152, memory controller 154 and I/O controller 158. System 150 also includes memory 156 that is coupled to memory controller 154 and a number of devices 164-1 through 164-N coupled to I/O controller 158. In one context, I/O controller 158 may be any device or integrated circuit that connects devices 164 to an internal computer system bus, such as, for example, a PCI bus. I/O controller 158 includes host interface unit 160 that facilitates communication with processor 152. Host interface unit 160 provides incoming request cycles (posted request cycles and non-posted request cycles) to patch module 100. The term "non-posted request cycles" and "non-posted cycle" are used to refer to any request cycles that require completions, including, but not limited to, memory read requests, configuration read requests and configuration write requests. The term "posted request cycle" or "posted cycle" are used to refer to any request cycles that completes at the source before it completes at the destination, such as, for example, memory write requests. In one embodiment, the incoming request cycles are received from memory controller 154 via a PCI Express interconnect coupled between I/O controller 158 and memory controller 154. I/O controller 158 also includes completion queue 162, which is coupled to patch module 100.

In operation, patch module 100 will sample incoming cycles and compare the cycle attributes with preprogrammed cycle attributes. Patch module 100 is capable of being programmed to perform various operations to enable a user to detect, repair and/or workaround a wide range of defects existing in I/O controller 158. In one embodiment, if a match is found, patch module 100 is capable of performing one or more of the following operations (1) insert timed delay, (2) insert conditional delay, (3) modify the request cycle that caused the patch trigger, (4) generate and send a new request cycle to an end-device, and (3) generate and send a completion cycle for a captured non-posted request cycle.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language. The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 2:
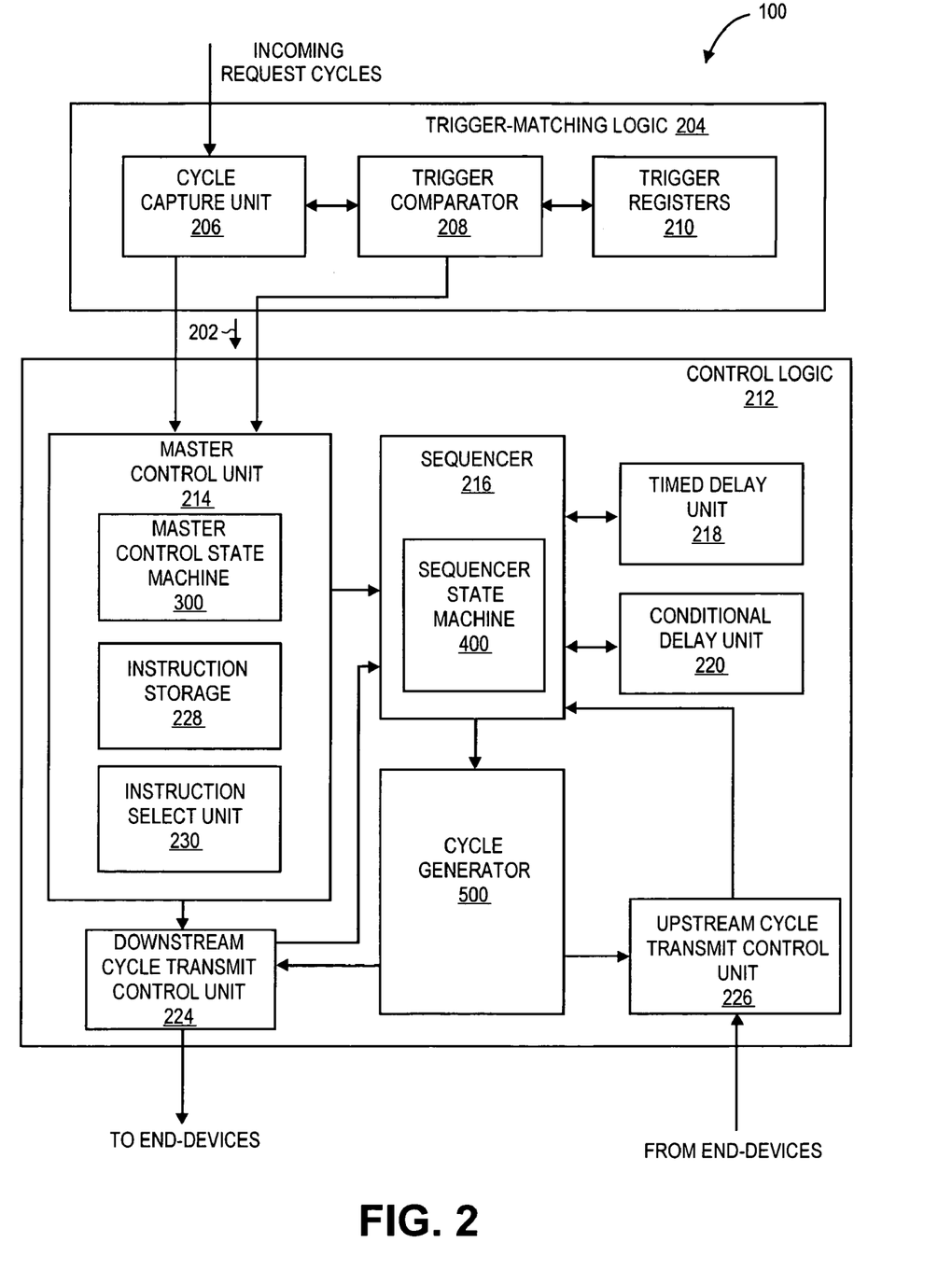
FIG. 2 shows a block diagram of a patch module according to one embodiment.

FIG. 2 shows patch module 100 according to one embodiment. In one embodiment path module 100 is incorporated within I/O controller 158, as shown in FIG. 1B. However, it should be noted that embodiments of the patch module, described herein, may be implemented in other types of integrated circuits. Patch module 100 generally includes trigger-matching logic 204 and control logic 212. In one embodiment, trigger-matching logic 204 includes cycle capture unit 206, trigger comparator 208, and trigger registers 210. Cycle capture unit 206 is coupled to receive incoming cycles from a requesting device, such as a processor, via an interface (e.g., host interface unit 160). Cycle capture unit 206 captures the incoming cycles and supplies information contained in the captured cycle to trigger comparator 208. Trigger comparator 208 compares the information supplied by cycle capture unit 206 with trigger conditions (e.g., preprogrammed cycle attributes) stored in trigger registers 210. In one embodiment, cycle capture unit is configured to generate handshake signals for capturing cycles from a bus (e.g., backbone bus) or host interface 160 included in I/O controller 158.

Trigger registers 210 are used to store a wide variety of trigger conditions or trigger events. The terms "trigger condition" and "trigger event" are used herein to describe any condition or event that computer system designers may wish to implement as conditions or activities that trigger the execution of the patch module. In one implementation, if it is desired to trigger on the presence of a non-posted cycle, trigger-matching logic 210 may be programmed, for example, by programming one or more of the trigger registers, to distinguish between non-posted cycles and posted cycles and provide a trigger signal to execute a set of instructions upon detection of a non-posted cycle. Other implementations are possible and contemplated. For example, trigger-matching logic may be programmed to trigger on certain address ranges, specific byte addresses, I/O space information, configuration space information and/or memory space information.

Once trigger-matching logic 204 detects that the incoming cycle matches one or more of the conditions or events stored in trigger registers 210, trigger matching logic 204 will send a trigger signal 202 to control logic 212 to indicate which of the trigger condition(s) matched with the currently captured cycle. Based on this information, control logic is configured to select a set of patch operations to be performed by patch module 100. If however, the information contained in the incoming cycle does not match the trigger conditions or events specified in trigger registers 210, the incoming cycle will be forwarded to the destination device via a downstream bus.

In the illustrated embodiment, control logic 212 generally includes master control unit 214, sequencer 216, cycle generator 500, timed delay unit 218 and conditional delay unit 220. Master control unit includes state machine 300, instruction storage 228 and instruction select unit 230. Instruction storage 228 is used to store instructions that can be performed by the patch module. The instructions may be programmed into the instruction storage using any suitable programming technique. Instruction select unit 230 selects instructions from instruction storage 228 based on the trigger condition(s) that matched with the currently captured cycle as indicated by the trigger signal 202 transmitted by trigger-matching logic 204. Instruction select unit 230 sends the selected instructions to sequencer 216 so that it can executed the selected instructions. The operations of master control unit 214 will be described in more detail with reference to FIG. 3. The operations of sequencer 216 will be described in more detail with reference to FIG. 4. The operations of cycle generator 222 will be described in more detail with reference to FIG. 5.

Figure 3:
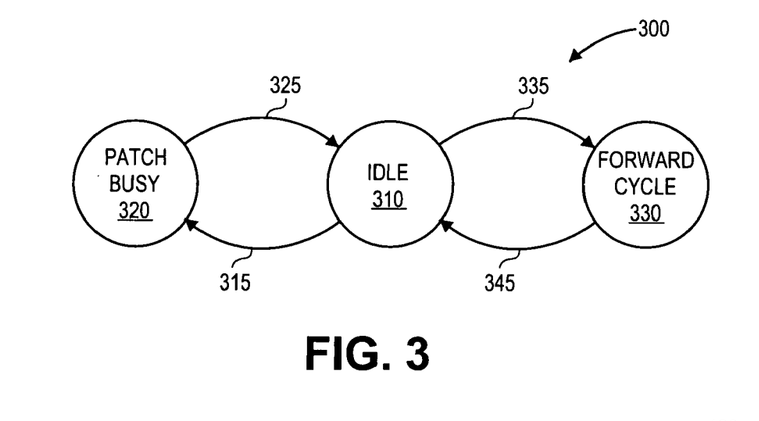
FIG. 3 shows a state diagram of a state machine incorporated within a master control unit of the patch module according to one embodiment.

FIG. 3 depicts one embodiment of state machine 300 included in the master control unit. State machine 300 includes idle state 310, patch busy state 320 and forward cycle state 330. State machine 300 remains in idle state 310 until an incoming cycle is received by the patch module via an internal bus residing in an integrated circuit chip, such as an I/O controller chip. When an incoming cycle is received, the trigger-matching logic determines if the information contained within the incoming cycle matches a trigger condition. If the incoming cycle causes a patch trigger, state machine 300 will transition from idle state 310 to patch busy state 320 as shown by arrow 315. In patch busy state 320, the master control unit will select a set of instructions that are to be performed by the sequencer based on the matched trigger condition(s). Additionally, the master control unit will activate the sequencer to iterate through each patch operation that is associated with the trigger. When the last patch operation has been executed by the patch sequencer, state machine 300 will transition from patch busy state 320 to idle state 310 as shown by arrow 325. If the incoming cycle does not cause a patch trigger, state machine 300 will transition from idle state 310 to forward cycle state 330 as shown by arrow 335. In forward cycle state 330, the master control unit will inform the downstream cycle transmit control unit (shown in FIG. 2) to send the captured cycle to its intended destination device. State machine 300 will return to idle state 310 when the captured cycle has been forwarded to the downstream cycle transmit control unit as shown by arrow 345.

Figure 4:
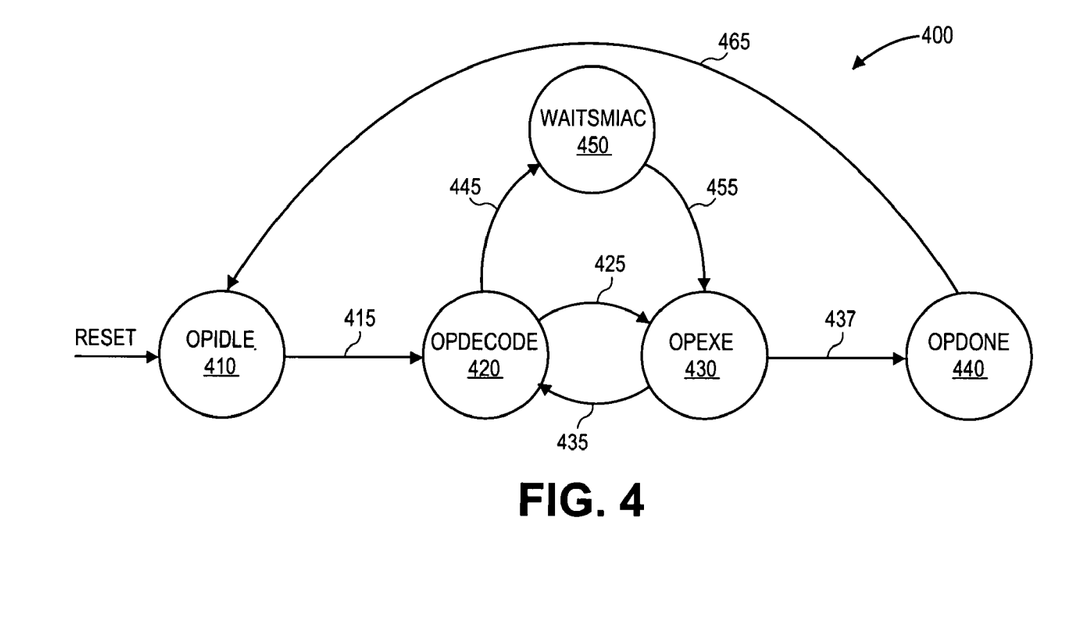
FIG. 4 shows a state diagram of a state machine incorporated within a sequencer of the patch module according to one embodiment.

The sequencer is responsible for stepping through the instruction sequence selected by the master control unit. FIG. 4 depicts one embodiment of state machine 400 included in the sequencer. State machine 400 includes opidle state 410, opdecode state 420, opexe state 430, waitsmiac state 450 and opdone state 440. State machine 400 starts in opidle state 410. The sequencer is responsible for iterating through each patch operation that is associated to a trigger. In one embodiment, the sequencer is configured to enable a set of patch operations to be sequenced back-to-back per trigger. As discussed above, when master control state machine 300 is in patch busy state 320, master control unit will activate sequencer state machine 400 by transitioning from opidle state 410 to opdecode state 420 as shown by arrow 415. During opdecode state 420, the first instruction is loaded and decoded by the sequencer to determine the type of patch operation to be performed. If there is no synchronous SMI (system management interrupt) associated with the instruction, the sequencer will transition from opdecode state 420 to opexe state 430 as shown by arrow 425.

In opexe state 430, the instruction loaded and decoded by the sequencer is executed, to perform the operation indicated by the instruction. If the currently loaded instruction is not the last instruction in the instruction sequence, the sequencer will transition back to opdecode state 420 as shown by arrow 435. In opdecode state 420, the next instruction will be loaded and decoded. This process of going back and forth between opdecode state 420 and opexe state 430 repeats until the last operation has been completed. Once the execution of the last operation in the instruction sequence has been completed, state machine 400 will transition to the opdone state 440 as shown by arrow 437 and automatically transition to opidle state 410 as shown by arrow 465.

In opdecode state 420, if state machine 400 determines that a synchronous SMI is associated with the currently loaded instruction, the sequencer will transition from opdecode state 420 to waitsmiac state 450, as shown by arrow 445, which causes the operation to be delayed until the corresponding synchronous SMI has been acknowledged to indicate that the currently loaded patch operation can make progress. Accordingly, when the synchronous SMI has been acknowledged, state machine 400 will transition from waitsmiac state 450 to opexe state 430 as shown by arrow 455. A SMI signal may be asserted to a processor to alert the processor that a SMI event has occurred. The SMI signal may be asserted for any of a large number of possible reasons. For example, the SMI signal may be asserted if a system resource seeks access to a certain range of memory or to a particular address.

In one embodiment, each patch operation is defined via a single 32-bit instruction. Table 1 describes the fields of 32-bit instruction according to one embodiment. Each 32-bit instruction includes a number of fields that contain information necessary for performing a patch operation as specified by the instruction.

TABLE 1

32-bit Instruction

| Field Name | Description |
| --- | --- |
| Opcode type | This field identifies the type of operation to be performed by the patch module. The types of operations identified by this field include, but not limited to, (1) timed delay operation, (2) conditional delay operation, (3) workspace register operation, (4) blocked register operation and (5) completion operation. |
| Forward flag | When this flag is set, the cycle generated by this instruction is forwarded to downstream bus. |
| Discard completion flag | When this flag is set, the completion queue is instructed to discard the completion associated with this request cycle so that the requesting device (e.g., host processor) does not receive the completion. This is needed for injected completion requested cycles (i.e., new cycles generated by the patch module). |
| Field select bits | This field indicates whether the instruction is operating on (1) cycle type, (2) address or (3) data. |
| Operator type | This field determines how the operand will modify the field (cycle type, address or data) selected. The types of operators identified by this field include, but not limited to, (1) Use the operand entry unmodified, (2) AND the selected register/field with the operand entry, (3) OR the selected register/field with the operating entry, and (4) XOR the selected register/field with the operating entry. |
| Unmodified completion header | When this flag is set, the header section of the completion queue is loaded with header information from the original unmodified non-postable cycle as captured in the blocked cycle registers. When this flag is not set, the header section of the completion queue is loaded with modified header information associated with modified request that is generated in the workspace registers. |
| Operand index | This field selects the entry from the operand array to be used by the operator. |
| Delay field | This field specifies an amount of timed delay provided by the timed delay operation. |
| SMI flag | When this flag is set, an SMI signal is generated and sent from the patch module to a host processor. |
| Terminate flag | This field indicates whether or not this instruction is the last instruction in the patch instruction sequence. |

Based on information contained in the 32-instruction, patch module 100 is capable of performing a wide range of patch operations to workaround various defects existing in I/O controller and/or other portions of computer system. In one embodiment, patch module 100, based on information contained in the 32-bit instruction, is capable of (1) inserting timed delay, (2) inserting conditional delay, (3) modifying the request cycle that caused the patch trigger, (4) generating and sending a new cycle via downstream bus, and (3) generating and sending a completion cycle for captured non-posted request cycle.

The type of operation to be performed by patch module is indicated in opcode type field, which may used to specify (1) timed delay operation, (2) conditional delay operation, (3) workspace register operation, (4) blocked register operation and (5) completion operation. Timed delay operation is used to provide a timed delay of a certain duration as specified by the delay field. Conditional delay operation is used to provide a delay until a particular internal state is reached, which may be indicated by an internal state signal. Workspace register operation is used to operate on one of workspace registers, which may be used as the starting cycle for modifying. Workspace register operation may be used for generating new injected cycles (i.e., new cycles generated by the patch module) or used for modifying information stored in workspace register. Blocked register operation is used to operate on one of blocked registers, which may be used as the starting cycle for modifying. Completion operation is used to generate a completion packet for captured non-posted cycles and return the completion packet to the requesting device (e.g., host processor).

Figure 5:
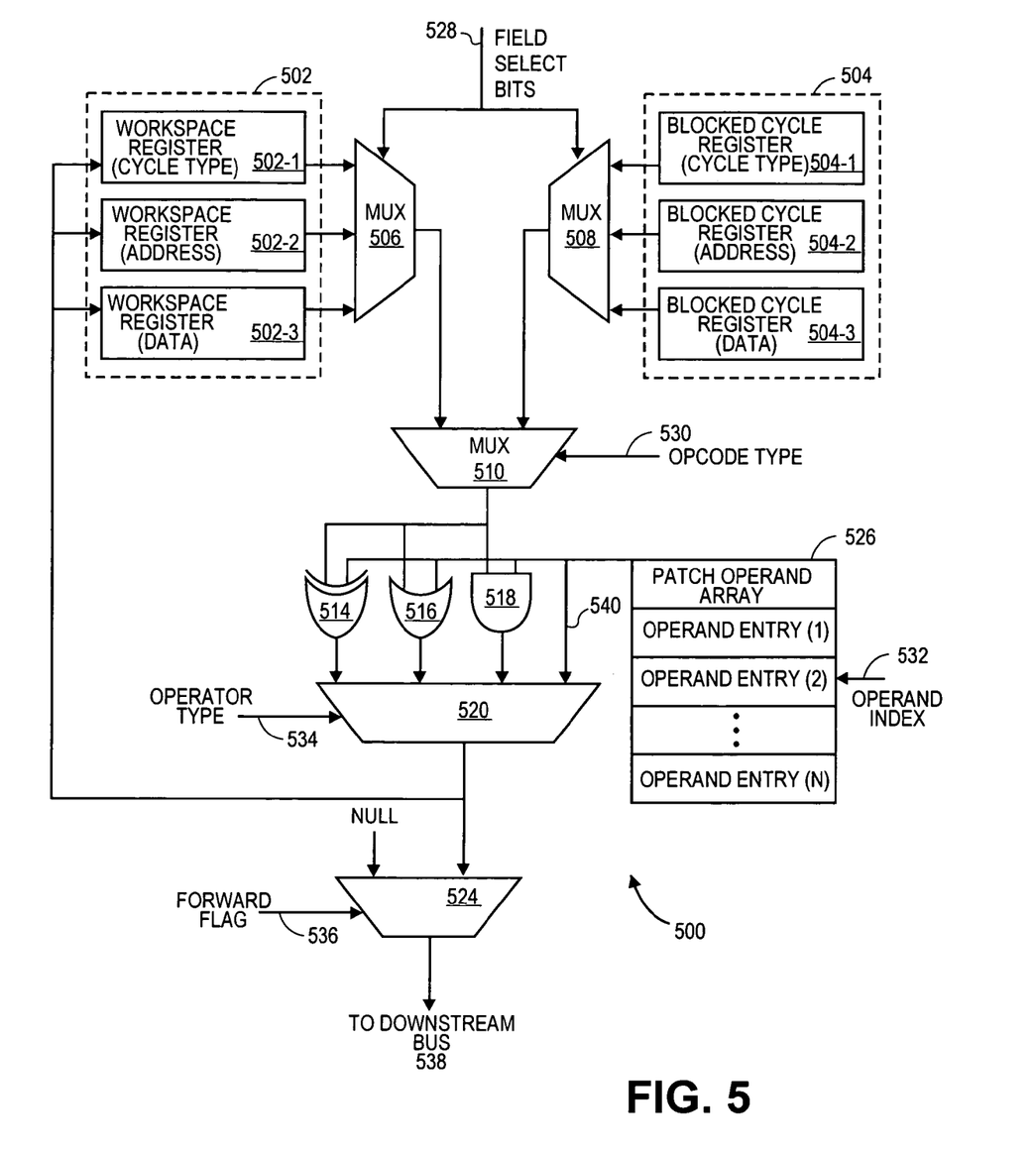
FIG. 5 shows a block diagram of a cycle generator of the patch module according to one embodiment.

FIG. 5 shows one embodiment of patch cycle generator 500 for executing a 32-bit instruction selected by the control logic of the patch module. The cycle generator is used to generate a modified cycle or a new cycle based on information contained in the currently loaded instruction. When an incoming cycle is received by the patch module, the information from the cycle that caused the patch module to trigger is stored in blocked cycle registers 504. In one embodiment, patch module employs three blocked cycle registers; namely cycle type register 504-1 is used to store cycle type related information associated with the captured cycle; address register 504-2 is used to store address information; and data register 504-3 is used to store data associated with the captured cycle. When the information contained in the blocked cycle registers is modified the resulting cycle is loaded into the workspace registers. There are also three workspace registers 502; namely cycle type register 502-1 is used to store cycle type information associated with the captured cycle; address register 502-2 is used to store address information; and data register 502-3 is used to store data associated with the captured cycle.

The workspace registers 502 are coupled to multiplexor 506, which selects one of the workspace registers (cycle type, address or data) to be sent to multiplexor 510 based on information supplied by the field select bits 528. The field select bits are contained within the 32-bit instruction and are used to indicate whether the instruction is operating on (1) cycle type register, (2) address register or (3) data register. Similarly, the blocked cycle registers 504 are coupled to multiplexor 508, which selects one of the blocked cycle registers (cycle type, address or data) to be sent to multiplexor 510 based on information supplied by the field select bits 528. Multiplexor 510 selects one of the workspace registers 502 and blocked cycle registers 504 to be sent to the rest of patch cycle generator 500 based on information supplied by opcode type field 530 of the instruction. Specifically, if the opcode type field 530 specifies that the workspace register operation is to be performed, one of the workspace registers 502 will be selected by multiplexor 510 to be sent to one of the inputs of XOR gate 514, OR gate 516 and AND gate 518. On the other hand, if the opcode type field 530 specifies that the blocked register operation is to be performed, one of the blocked cycle registers 504 will be selected by multiplexor 510 to be sent to one of the inputs of XOR gate 514, OR gate 516 and AND gate 518.

The other input of the XOR gate 514, OR gate 516 and AND gate 518 is coupled to receive an operand entry from patch operand array 526. Patch operand array includes a number of operand entries. Patch cycle generator selects one of the operand entries to be used during the current operation based on information supplied by the operand index field of the instruction. The selected operand entry is used to modify the data contained in the register selected by multiplexor 510. In one embodiment, XOR gate, OR gate and AND gate are used to logically combined the selected register with the selected operand entry.

Patch cycle generator further includes multiplexor 520 to select one of the outputs of the XOR gate, AND gate and OR gate to be sent to multiplexor 524. One of the inputs of multiplexor 520 is coupled directly to patch operand array 526 to receive the selected entry. The output of multiplexor 520 is determined by operator type field 534 of the instruction. Thus, if one of XOR, OR or AND operation is indicated by the operator type field 534, then output from the appropriate gate is selected by multiplexor 520 to be sent the remainder of cycle generator 500. Otherwise, if the operator type field 534 indicates that the values in the selected operand entry is to be loaded unmodified, then input 540 (coupled directly to the patch operand array 526) is selected by multiplexor 520 to be sent to the remainder of cycle generator 500. The output of the multiplexor 520 is also coupled to the workspace registers 502 so that the resulting cycle can be loaded back into one of the workspace registers 502. Multiplexor 524 is used to determine whether or not the resulting cycle needs to be forwarded to downstream bus based on the forward flag of the instruction. Thus, multiplexor 524 will forward the resulting cycle to downstream bus if the forward flag is set.

Figure 6:
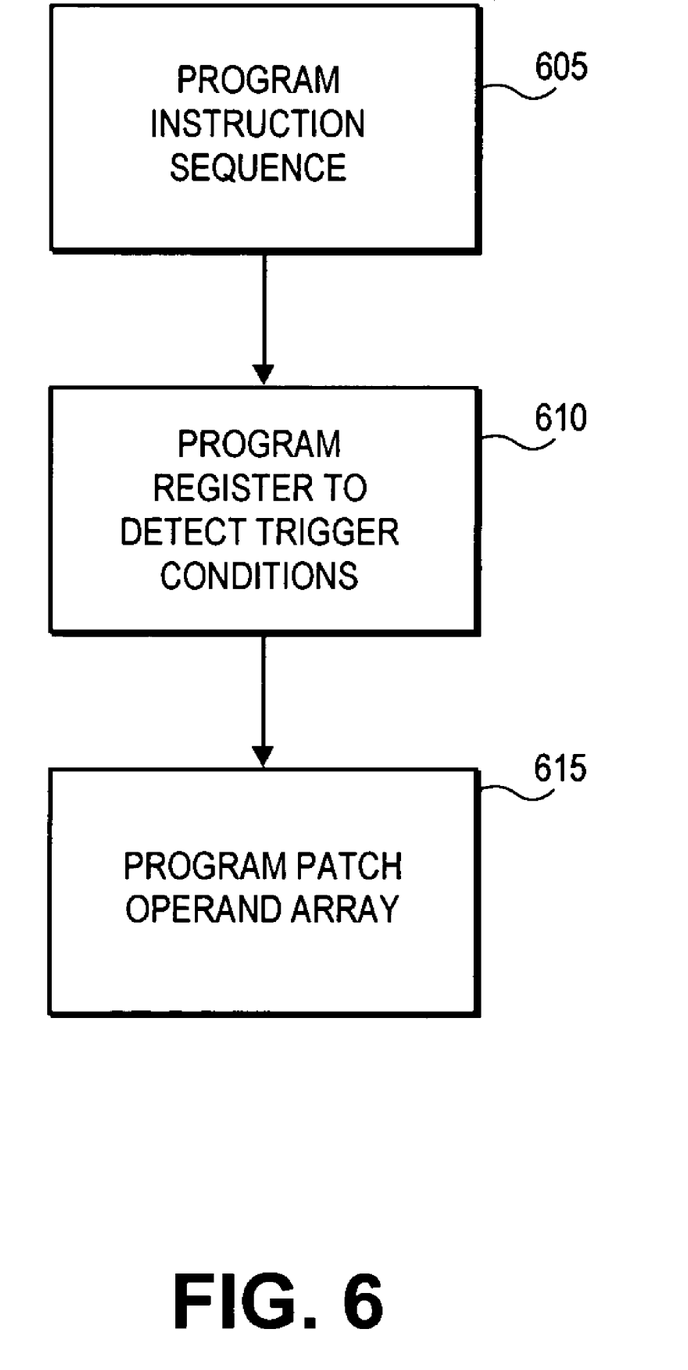
FIG. 6 shows a flowchart diagram of operations involved in programming the patch module according to one embodiment.

FIG. 6 shows a flowchart diagram of operations involved in programming the patch module according to one embodiment. In block 605, the buffer that holds the instruction sequence is programmed by software. In block 610, trigger registers residing within the trigger-matching logic are programmed to detect trigger conditions. In block 615, the entries contained within the patch operand array are programmed by software.

Figure 7:
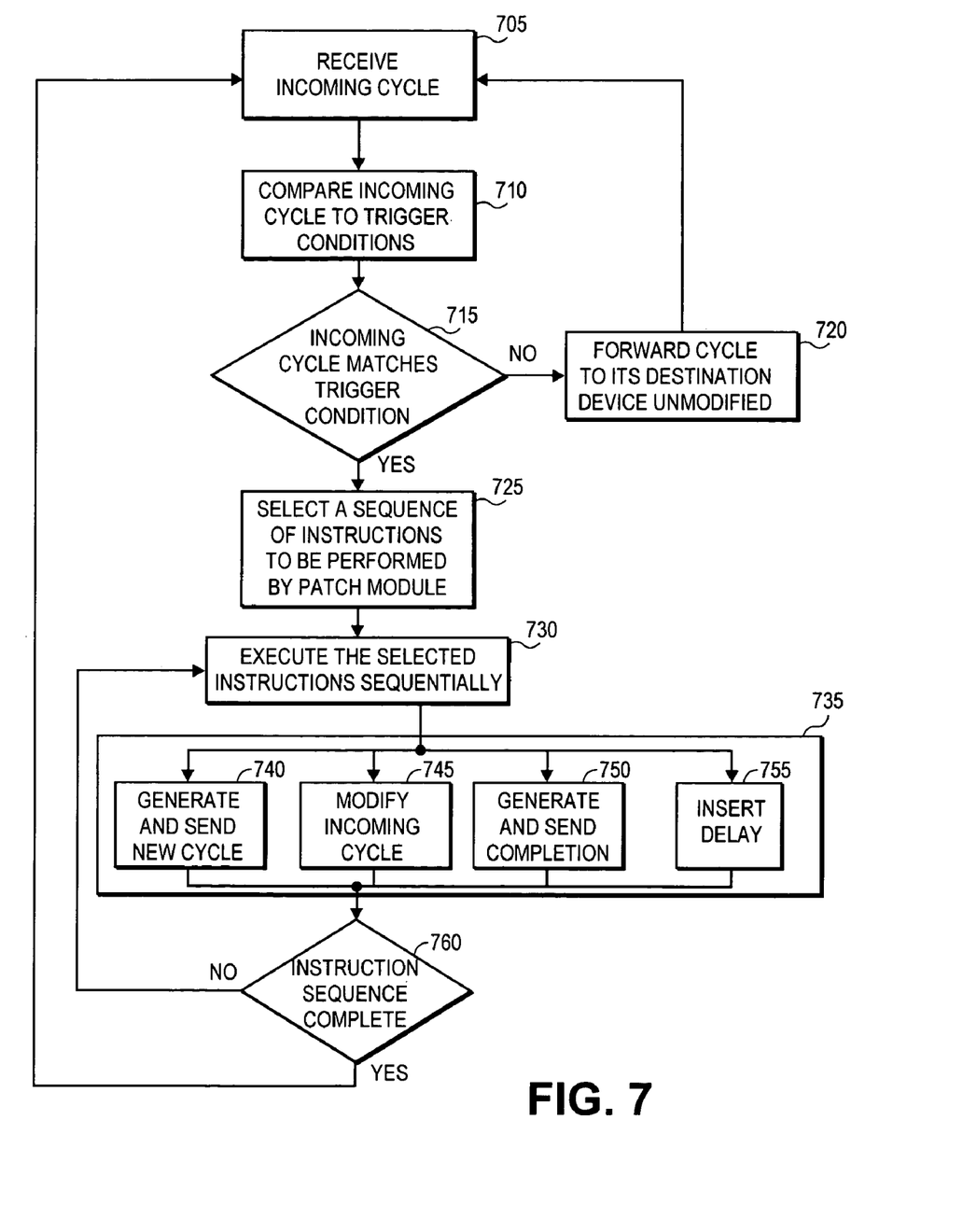
FIG. 7 shows a flowchart diagram of operations performed by the patch module according to one embodiment.

FIG. 7 shows a flowchart diagram of operations performed by the patch module according to one embodiment. In block 705, request cycles coming into an integrated circuit chip (i.e., I/O controller) are captured and relevant information from the header section the captured cycle is loaded into block cycle registers. In block 710, the information stored in the block cycle registers is compared with information stored in trigger registers. Patch module may be implemented with various trigger conditions, including, but not limited to, accesses to particular regions of memory space, configuration space or accesses to certain ports or devices. In block 715, the patch module determines whether the captured cycle matches one or more of the trigger conditions. In block 720, incoming cycles that do not cause a trigger are routed on to the rest of the chip (e.g., I/O controller). The patch module then returns to process the next incoming cycle. In block 725, if the incoming cycle matches a trigger condition, a sequence of instructions to be performed by the patch module is selected by the control logic based on the matched trigger condition.

Once the sequence of instructions has been selected, the patch module proceeds in a loop (blocks 730-760) to execute the sequence of instructions sequentially. In block 735, the execution of the current instruction may perform one of the following operations (1) generate and send a new cycle, (2) modify the request cycle that caused the patch trigger, (3) generate and send a completion cycle, and (4) insert delay. In block 740, the patch module is capable of generating and sending a new cycle. This may be useful in modifying and/or accessing the state of certain components or ports of the computer system. In block 745, the patch module is capable of modifying the incoming cycle that is captured. For example, if the trigger-matching logic detects an error condition, such as an incorrect address to a register, patch sequence could modify the address associated with the cycle and route it to a different location. In one embodiment, the patch module is capable of working around a failure that can be caused by a non-posted request cycle (e.g., read request) by capturing such non-posted request cycle and performing the necessary modification to the captured cycle before presenting it to the final destination. The read request will be modified properly such that it can be decoded correctly by the end-device and the corresponding completion data can be returned to the requesting device (e.g., host processor).

In block 750, the patch module is capable of generating and returning completion to the requester, which corresponds to the capture request cycle. This may be useful for avoiding failures caused by completion packet not being returned as a result of defects or conditions existing in the system. In block 755, the patch module is capable of delaying the stream of incoming cycles. This may be useful for avoiding failures in which concurrent events are required. In block 760, once the patch device completes execution of each instruction in the patch sequence, it determines whether or not there are additional instructions in the sequence. If the sequence is not complete, then the next instruction is processed executed. If the sequence is complete, the patch device returns to process the next incoming cycle.

Figure 8:
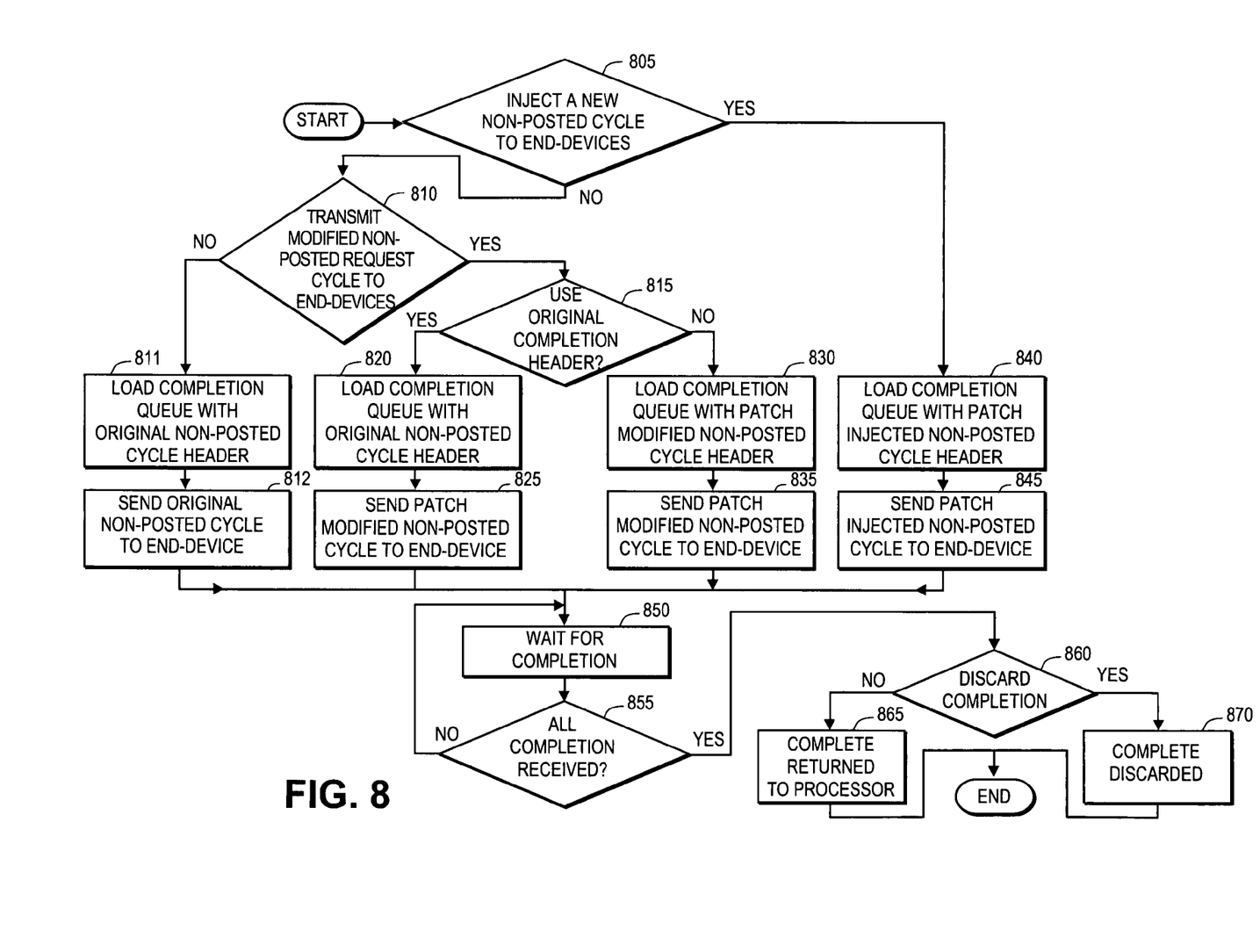
FIG. 8 shows a flowchart diagram of operations involved in processing a non-posted cycle by the patch module according to one embodiment.

In one embodiment, the patch module is configured to determine is the incoming request cycle that caused a patch trigger is a non-posted request. In one embodiment, the patch module is capable of working around a captured non-posted request cycle by controlling header information loaded into the completion queue and by instructing the completion queue whether or not to discard a completion received from a designated end-device. FIG. 8 shows a flowchart diagram of operations involved in processing a non-posted cycle according to one embodiment. As discussed above, the patch module will capture incoming request cycles and compare the cycle attributes against preprogrammed cycle attributes. If a match is found, the patch module may perform a series of operations in response to the captured request cycle. In situations where the captured request cycle is a non-posted cycle, the patch module executes an instruction sequence to transmit a modified non-posted cycle to end-devices and/or to inject a new non-posted cycle.

In block 805, the patch module determines if a new non-posted cycle needs to be injected to end-devices. If the patch module selects to generate a new cycle (block 805, yes), the patch module will generate a new cycle as specified by the current instruction and will load the completion queue with header information associated with the new cycle in block 840. In block 845, the patch module forwards the new cycle to end-devices by presenting the new cycle on a downstream bus. The load of the completion queue may occur at the same time as the new cycle is presented on the downstream bus. In one embodiment, because the new cycle has been generated within the I/O controller by the patch module, the completion associated with the new cycle will be discarded when received from the designated end-device and will not be returned to the requesting device that issued the original captured request cycle.

If the patch module selects to transmit a modified non-posted request cycle to end-devices (block 810, yes), the patch module will determine whether original completion header or modified completion header will be used when returning the completion packet to the requesting device (e.g., host processor). If the patch module decides to use the original completion header (block 815, yes), the patch module will load the completion queue with original non-posted cycle header in block 820. In block 825, the patch module will generate a modified non-posted cycle as specified by the current instruction and forward the patch modified non-posted cycle via a downstream bus to end-devices. The loading of the completion queue may occur at the same time as the modified non-posted cycle is presented on the downstream bus. When this option is selected (blocks 820-825), the completion packet returned to the requesting device will contain header information associated with the original non-posted cycle issued by the requesting device although the corresponding non-posted cycle has been modified by the patch module.

In one embodiment, at the same time as when the completion queue is loaded with the original completion header information (block 820), the original non-posted request cycle with unsupported transaction (UT) flag is asserted and presented on the downstream bus. When the UT flag is asserted, it conveys to end-devices to ignore the corresponding cycle. Then in block 825, the modified non-posted cycle will be transmitted to the end-devices. Hence when the completion which is received from the designated end-device is returned to the requesting device, it will be returned with the original completion header.

If the patch module decides not to use the original completion header (block 815, no), the patch module will generate a modified non-posted cycle as specified by the current instruction and load the completion queue with the header information obtained from the modified non-posted cycle in block 830. In block 835, the patch module will send the patch modified non-posted cycle via downstream bus to end-devices. The loading of the completion queue may occur at the same time as the modified non-posted cycle is presented on the downstream bus. Subsequently, the completion which is received by the completion queue from the designated end-device is returned to the requesting device via an upstream bus. When this option is selected (blocks 830-835), the completion packet returned to the requesting device will contain the modified completion header.

If the patch module decides to send the original non-posted cycle (block 810, no) to end-devices unmodified, the completion queue will be loaded with the original non-posted cycle header (in block 811) and the original non-posted cycle will be transmitted to end-devices via a downstream bus (in block 812).

In block 850, the patch module will wait for all portions of completion to be returned by the designated end-device to the completion queue. When the patch module is notified that all portions of completion have been received by the completion queue (block 855, yes), the patch module will examine the setting in the current instruction to determine if the completion needs to be discarded in block 860. In one embodiment, this is determined by examining the discard completion flag in the 32-bit instruction, as described above. When the discard completion flag is set, the completion queue is instructed to discard the completion associated with the current request cycle so that the requesting device that issued the original captured cycle does not receive the completion associated with the new injected non-posted cycle. If the discard completion flag is not set (block 860, no), the completion returned by the designated end-device is returned to the requesting device by the completion queue in block 865. Otherwise, if the discard completion flag is set (block 860, yes), the patch module will instruct the completion queue to discard the completion returned by the designated end-device in block 870.

Embodiments of the patch module described herein may be used to workaround a wide range of defects and conditions. One example of a patch module usage is as follows. Suppose a defect exists in a computer system such that a read to a device (e.g., endpoint device) will return a wrong data unless a configuration setting is set or changed. In this case, the patch module can be programmed to trigger on that particular read. Once triggered, the patch module can be programmed to inject a configuration write (non-posted cycle) to temporarily change the device setting, then perform the original read with completion data returned back to the processor, followed by another configuration write to change the setting back to the original value. Another example of a patch module usage is as follows. Suppose a defect exists in a computer system such that a first read request to a particular device will not return a good data. In this case, the patch module can be programmed to trigger on the first read request to that particular device. Once triggered, the patch module can be programmed to inject the original read and discard the returned data. Then issue the same read request again and this time, return the good data back to the requesting device (e.g., processor). Although specific examples of how the patch module may be used are described above, it should be noted that embodiments of the patch module are not intended to be limited to these specific examples. Rather, the patch module is capable of being programmed in a wide variety of ways to workaround a wide range of defects and conditions existing within a computer system.

While several embodiments have been described, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   an input/output (I/O) controller to receive request cycles from a requesting device, the I/O controller including a completion queue; and
   a patch module coupled to the completion queue, the patch module to capture an incoming request cycle received by the I/O controller and to determine if the captured incoming request cycle matches one or more of preprogrammed trigger conditions, wherein the patch module can work around a captured non-posted request cycle by controlling header information loaded into the completion queue and by instructing the completion queue whether or not to discard a completion packet received from a designated end-device, wherein the requesting device is different from the designated end-device.

2. The system of claim 1, wherein if a captured non-posted cycle causes a patch trigger, the patch module can load the completion queue with unmodified header information obtained from the captured non-posted cycle.

3. The system of claim 2, wherein the patch module can send a modified non-posted cycle to a destination device.

4. The system of claim 3, wherein the patch module can return a completion associated with the modified non-posted cycle to the requesting device.

5. The system of claim 1, wherein if a captured non-posted cycle causes a patch trigger, the patch module can load the completion queue with modified header obtained from a non-posted cycle modified by the patch module.

6. The system of claim 5, wherein the patch module can send the modified non-posted cycle to a destination device.

7. The system of claim 6, wherein the patch module can return a completion associated with the modified non-posted cycle to the requesting device.

8. The system of claim 1, wherein if a captured non-posted cycle causes a patch trigger, the patch module can load the completion queue with header information obtained from a new cycle generated by the patch module.

9. The system of claim 8, wherein the patch module can send the new cycle to a destination device.

10. The system of claim 9, wherein the patch module can instruct the completion queue to discard a completion associated with the new cycle.

11. A method comprising:
    receiving an incoming request cycle from a requesting device;
    determining if the received incoming request cycle matches one or more of preprogrammed trigger conditions;
    determining if the received incoming request cycle is a non-posted request cycle;
    if the received incoming request cycle matches a trigger condition and is a non-posted request cycle, loading a completion queue with one of following (1) unmodified header information from the captured non-posted request cycle, (2) modified header information associated with a modified non-posted request cycle, or (3) header information associated with a new request cycle generated in response the received incoming request cycle;
    instructing the completion queue whether or not to discard a completion packet received from a designated end-device when the completion queue is loaded with header information from one of the modified, non-posted request cycle and the generated, new request cycle, wherein the requesting device is different from the designated end-device.

12. The method of claim 11, further comprising:
    generating a modified non-posted request cycle in response to a matched trigger condition;
    sending the modified non-posted request cycle to a destination device.

13. The method of claim 12, further comprising:
    returning a completion associated with the modified non-posted request cycle to the requesting device.

14. The method of claim 11, further comprising:
    generating a new request cycle in response to a matched trigger condition;
    sending the new request cycle to a destination device.

15. The method of claim 14, further comprising:
    discarding a completion associated with the new request cycle received from the destination device.

16. A patch module comprising:
    a trigger-matching logic to capture an incoming request cycle from a requesting device and determine if the captured incoming request cycle matches one or more of trigger conditions; and
    a control logic coupled to the trigger-matching logic to select a set of instructions upon detection of at least one matched trigger condition and to execute operations as specified by the selected set of instructions, wherein if the captured request cycle that caused a trigger is a non-posted request cycle, the control logic instructs a completion queue to load the completion queue with one of the following (1) unmodified header information from the captured non-posted request cycle, (2) modified header information associated with modified non-posted request cycle, or (3) header information associated with a new request cycle generated in response the captured request cycle, wherein the control logic instructs the completion queue whether or not to return a completion packet received from a designated end-device when the completion queue is loaded with header information from one of the modified non-posted request cycle and the generated, new request cycle to the requesting device, wherein the requesting device is different from the designated end-device.

17. The patch module of claim 16, wherein the trigger-matching logic and the control logic are incorporated within an Input/Output (I/O) chip.

18. The patch module of claim 16, wherein the control logic generates a modified non-posted request cycle based on the at least one matched trigger condition and to send the modified non-posted request cycle to a destination device.

19. The patch module of claim 16, wherein the control logic generates a new request cycle based on the at least one matched trigger condition and to send the new request cycle to a destination device.

20. A machine-readable medium that provides instructions, which when executed by a processor cause the processor the perform operations comprising: receiving an incoming request cycle from a requesting device;

determining if the received incoming request cycle matches one or more of preprogrammed trigger conditions;

determining if the received incoming request cycle is a non-posted request cycle;

if the received incoming request cycle matches a trigger condition and is a non-posted request cycle, loading a completion queue with one of following (1) unmodified header information from the captured non-posted request cycle, (2) modified header information associated with modified non-posted request cycle, or (3) header information associated with a new request cycle generated in response the received incoming request cycle; and instructing the completion queue whether or not to discard a completion packet received from a designated end-device when the completion queue is loaded within header information from one of the modified, non-posted request cycle and the generated, new request cycle, wherein the requesting device is different from the designated end-device.

21. The machine-readable medium of claim 20, wherein the operations performed by the processor further comprise:

generating a modified non-posted request cycle in response to a matched trigger condition;

sending the modified non-posted request cycle to a destination device.

22. The machine-readable medium of claim 21, wherein the operations performed by the processor further comprise:

returning a completion associated with the modified non-posted request cycle to the requesting device.

23. The machine-readable medium of claim 20, wherein the operations performed by the processor further comprise:

generating a new request cycle in response to a matched trigger condition;

sending the new request cycle to a destination device; and discarding a completion associated with the new request cycle received from the destination device.

* * * * *